United States Patent [19]
Wilke et al.

[11] 3,708,954
[45] Jan. 9, 1973

[54] PACKAGING MACHINE WITH CUTTING MECHANISM

[75] Inventors: Howard C. Wilke, Belvidere; Romaine A. Williams, Rockford, both of Ill.

[73] Assignee: Anderson Bros. Mfg. Co., Rockford, Ill.

[22] Filed: March 15, 1971

[21] Appl. No.: 124,206

[52] U.S. Cl. .................. 53/329, 83/327, 83/645
[51] Int. Cl. ...... B65b 7/28, B23d 25/04, B23d 25/06
[58] Field of Search..........53/329, 389, 66, 372, 373; 30/181, 238; 83/327, 321, 338, 642, 645

[56] References Cited

UNITED STATES PATENTS

| | | | |
|---|---|---|---|
| 2,982,067 | 5/1961 | Dakin | 53/389 X |
| 3,246,448 | 4/1966 | Amic, Sr. | 53/373 |
| 3,619,972 | 11/1971 | Pringle et al | 53/329 X |
| 3,343,336 | 9/1967 | Bradford | 53/329 |
| 3,540,186 | 11/1970 | Parvin et al | 53/329 X |
| 3,538,606 | 11/1970 | Piatek et al | 83/327 X |
| 3,530,755 | 9/1970 | Gugler | 83/642 X |
| 3,516,223 | 6/1970 | Andersen et al | 53/372 X |
| 3,491,510 | 1/1970 | Sternau | 53/329 X |

Primary Examiner—Travis S. McGehee
Assistant Examiner—Horace M. Culver
Attorney—McCanna, Morsbach, Pillote & Muir

[57] ABSTRACT

The machine has a conveyor which continuously advances containers past a sealing head and a cutting station. The sealing head seals a continuous strip of cover material to the containers. A pair of cutters are mounted for orbital movement at the cutting station. A cam is mounted on the machine to be engaged by a cam follower which is carried with the cutters to move the cutters crosswise of the conveyor and sever the cover material between adjacent containers.

10 Claims, 7 Drawing Figures

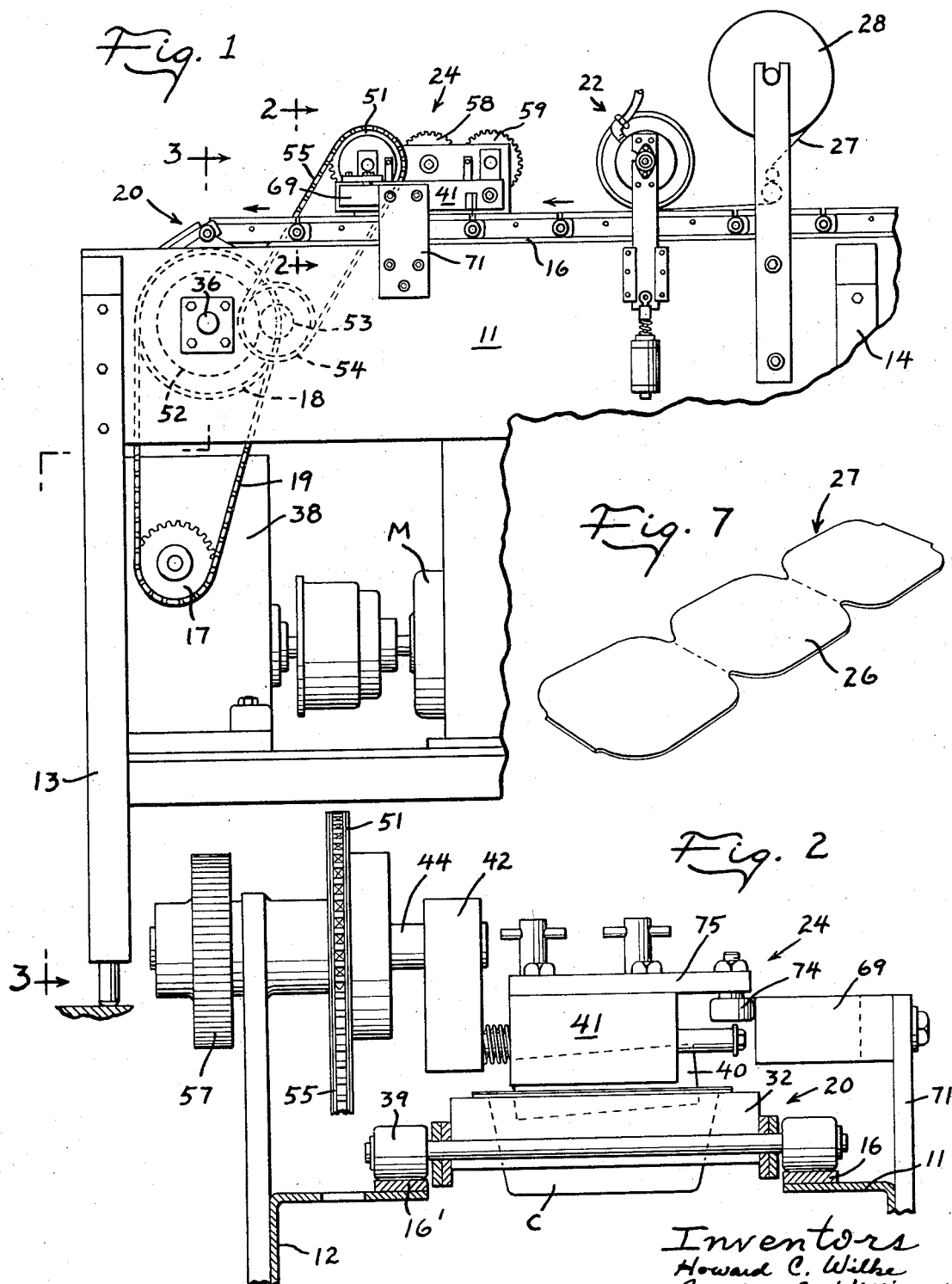

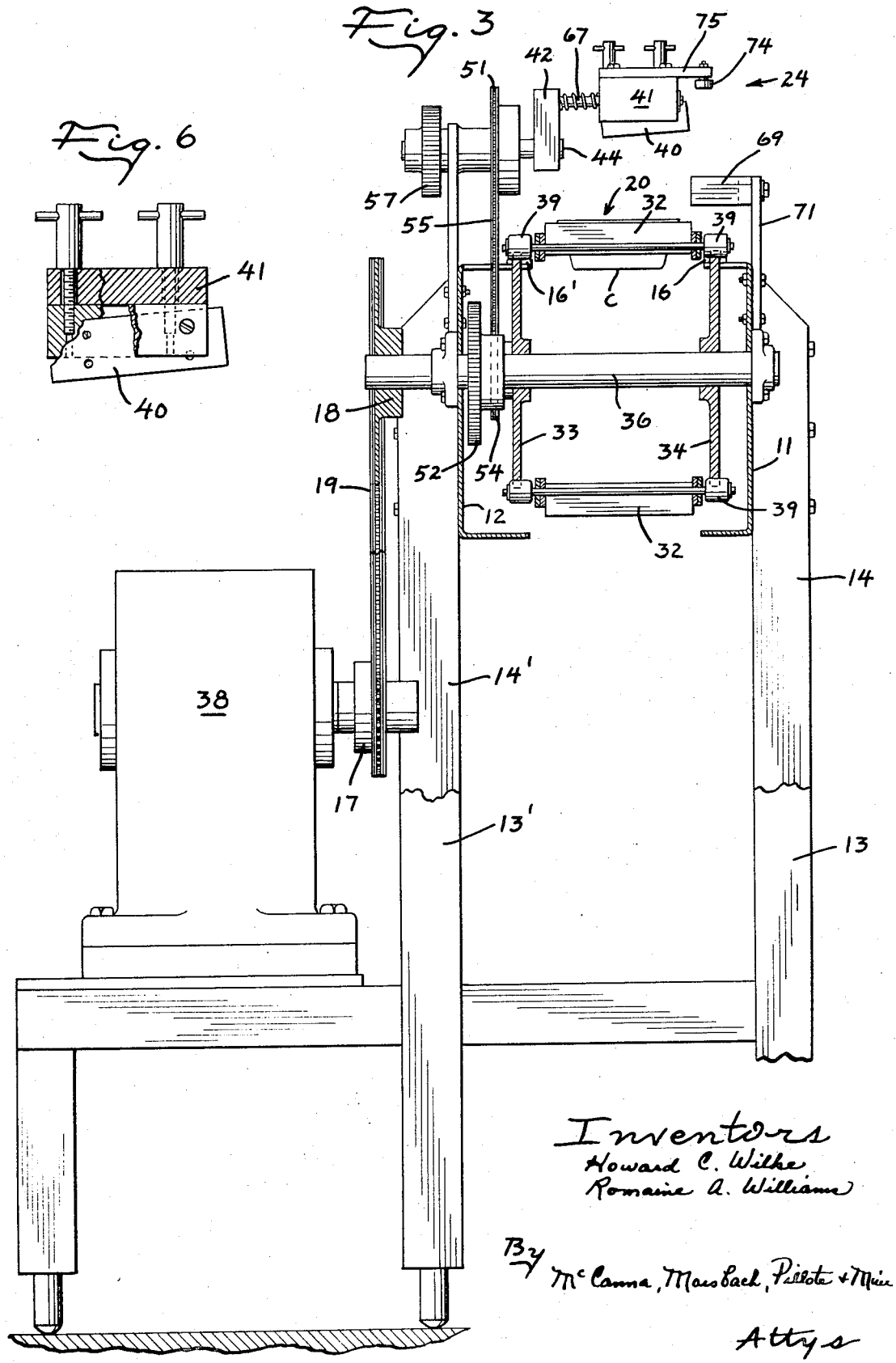

Inventors
Howard C. Wilke
Romaine A. Williams
By McCanna, Morsbach, Pillote + Muir
Attys

PACKAGING MACHINE WITH CUTTING MECHANISM

BACKGROUND

The invention pertains generally to packaging and more particularly to a packaging machine with cover feeding and cutting.

Various packaging machines having mechanism for cover feeding and cutting between adjacent packages are shown in the following patents: U.S. Pat. No. 3,436,894, issued Apr. 8, 1969 to Robert P. Sorensen; U.S. Pat. No. 3,490,196, issued Jan. 20, 1970 to Robert P. Sorensen; and U.S. Pat. No. 3,553,930, issued Jan. 12, 1971 to Ralph F. Anderson et al. While the cutting mechanisms shown in these patents are wholly reliable for most types of cover material, they are not totally satisfactory for some rather tough cover materials.

SUMMARY

The present invention relates to a packaging machine with cutting mechanism.

It is a general object of the present invention to provide a packaging machine with a cutting mechanism which is eminently reliable for cutting cover materials of the toughest types.

Another object is to provide a packaging machine with a continuously moving conveyor and an orbital-type cutting mechanism for cutting the cover material as it is advanced.

Still another object of the present invention is to provide a packaging machine in accordance with the foregoing object in which the cutting mechanism is arranged to move crosswise of the conveyor while orbiting to sever the cover material.

These, and other objects and advantages of the present invention, will become apparent as the same becomes better understood from the following detailed description when taken in conjunction with the accompanying drawings.

DRAWINGS

FIG. 1 is a fragmentary elevational view of a packaging machine constructed in accordance with the present invention;

FIG. 2 is a large scale cross-sectional view taken generally along line 2—2 of FIG. 1 and showing the cutting mechanism in its lowest position;

FIG. 3 is a cross-sectional view taken generally along broken line 3—3 of FIG. 1, on a scale intermediate that of FIGS. 1 and 2, and showing the cutting mechanism in its raised position;

Figure 5:
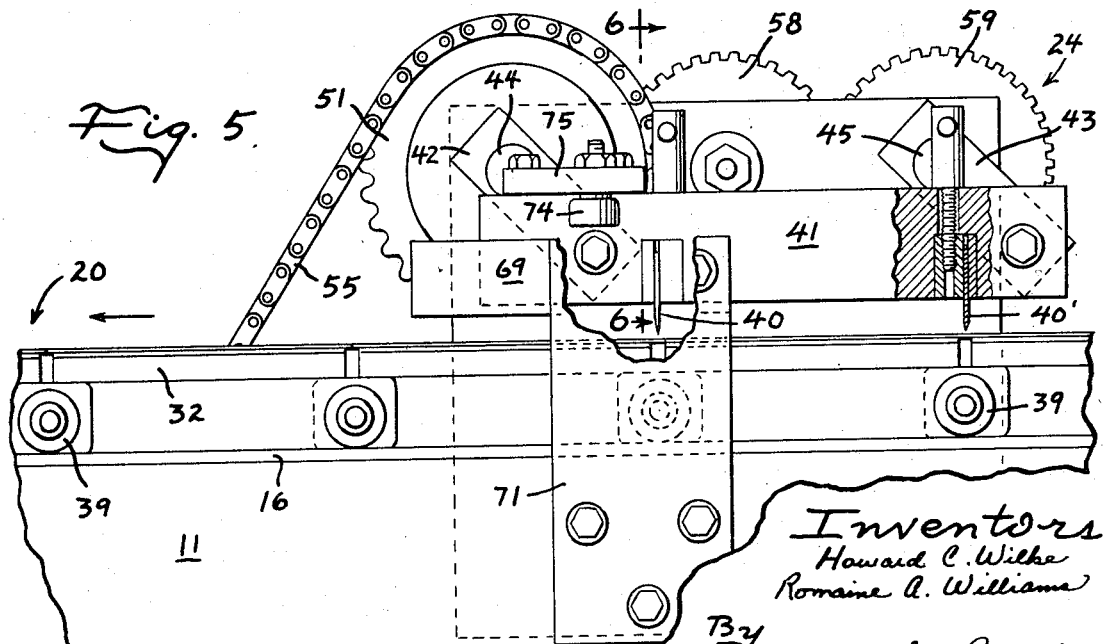
FIG. 5 is a fragmentary front elevation of the illustration of FIG. 4 and having portions broken away for better showing of the relationship of the parts.

FIG. 6, on page 2 of the drawings, is a cross-sectional view of the cutter taken generally along line 6—6 of FIG. 5; and FIG. 7, on sheet 1 of the drawings, is a perspective view of one suitable strip of cover material which can be utilized in the packaging machine of the present invention.

DESCRIPTION

Reference is now made more particularly to the drawings which illustrate the best presently known mode of carrying out the invention and wherein similar reference characters indicate the same parts throughout the several views.

One preferred embodiment of the machine includes channel-shaped side panels 11 and 12 supported on a plurality of legs such as at 13, 13' and 14, 14'. Rails 16 and 16' are mounted on the upper flanges of side panels 11, 12, respectively to support the upper flight of an endless conveyor 20. The conveyor 20 advances a number of containers C simultaneously and continuously past a sealing head 22 and a cutting means 24. The container C advantageously has an outwardly extending flange at the top and has a cover 26 (see FIG. 4) sealed to the flange by the sealing head 22. The covers 26 are advantageously formed from a thin web 27 continuously fed from a roll or supply 28, as best shown in FIG. 1.

The conveyor 20 includes a plurality of pockets 32 shaped for receiving the container C. The pockets 32 are of the general construction illustrated and described in the aforementioned U.S. Pat. No. 3,436,894 and reference is made thereto for a more complete description. Preferably, the pockets are swingably connected together in end-to-end relationship to form an endless type conveyor 20. As described in that patent, star wheels 33, 34 are mounted on a driven shaft 36 to drive the conveyor by engaging rollers 39 (see FIG. 3). The shaft 36 is driven by a motor M through a variable speed drive 38 and sprockets 17 and 18 which are interconnected by chain 19.

In general, the conveyor 20 continuously advances a plurality of the containers C in one direction. The strip of cover material 27 is fed into an overlying relationship and sealed to the tops of the containers by the sealing head 22. The sealing head may be of any suitable construction and may, for example, be a heat sealing head for use with cover material having a suitable thermoplastic coating thereon. As previously indicated, the cover material may be quite tough and may, for example, be an aluminum foil having an outer layer of paper affixed thereto and a thermoplastic coating for sealing to the containers C.

In accordance with the present invention, a cutting mechanism is provided at the cutting station 24 for cutting the strip of cover material 27 between adjacent containers C to thereby separate the same. As shown in the drawings, cutter blades 40, 40' are mounted on a support bar 41 and the support bar is mounted by cranks 42 and 43 on relatively parallel shafts 44 and 45, respectively. When the shafts 44 and 45 are positively rotated, the support bar 41 moves in an orbital path while remaining parallel to the upper flight of the conveyor 20.

A sprocket 51 is secured to shaft 44 and is driven from the driven shaft 36 by means of a spur gear 52 secured to the driven shaft 36 which meshes with a second spur gear 53 as shown in FIG. 1. Another sprocket 54 is secured to spur gear 53 and is interconnected with sprocket 51 by chain 55. In this manner, shaft 44 is driven in timed relation with the advancement of the conveyor pockets. Shafts 44 and 45 are simultaneously rotated by means of intermeshing spur gears 57–59 best shown in FIG. 4. The direction of rotation of shafts 44 and 45 is selected so that the cutters move in the same direction as the moving conveyor pockets at the lower portion of the orbit. This allows cutting the cover film 27 while the conveyor pockets are in motion. As best seen in FIG. 5, the spacing of the cutter blades 40 and 40' is equal to the pitch of the conveyor pockets so that the blades can enter between adjacent pockets and, in the embodiment illustrated, slice the cover film in two locations for each revolution of the cutting mechanism.

Provision is also made for imparting a motion to the cutter blades 40 in a direction crosswise of the direction of movement of the conveyor 20 so as to produce a shearing action on the cover film 27. As shown in FIGS. 2 and 3, the cutter blades 40 are preferably inclined in a direction crosswise of the conveyor and the support 41 is slidably mounted on rods 67 attached to the arms 42 and 43. The support 41 can therefore shift horizontally in a direction crosswise of the direction of movement of the conveyor. Springs 68 yieldably urge the support 41 in a direction away from the arms 42 and 43. A cam 69 is mounted on a stationary portion of the machine as by upright support 71 which is bolted to side panel 11. The cam 69 has a cam face 69a disposed oblique to the conveyor and arranged to engage a cam follower 74 which is carried by the support 41 by means of a mounting 75.

Figure 4:
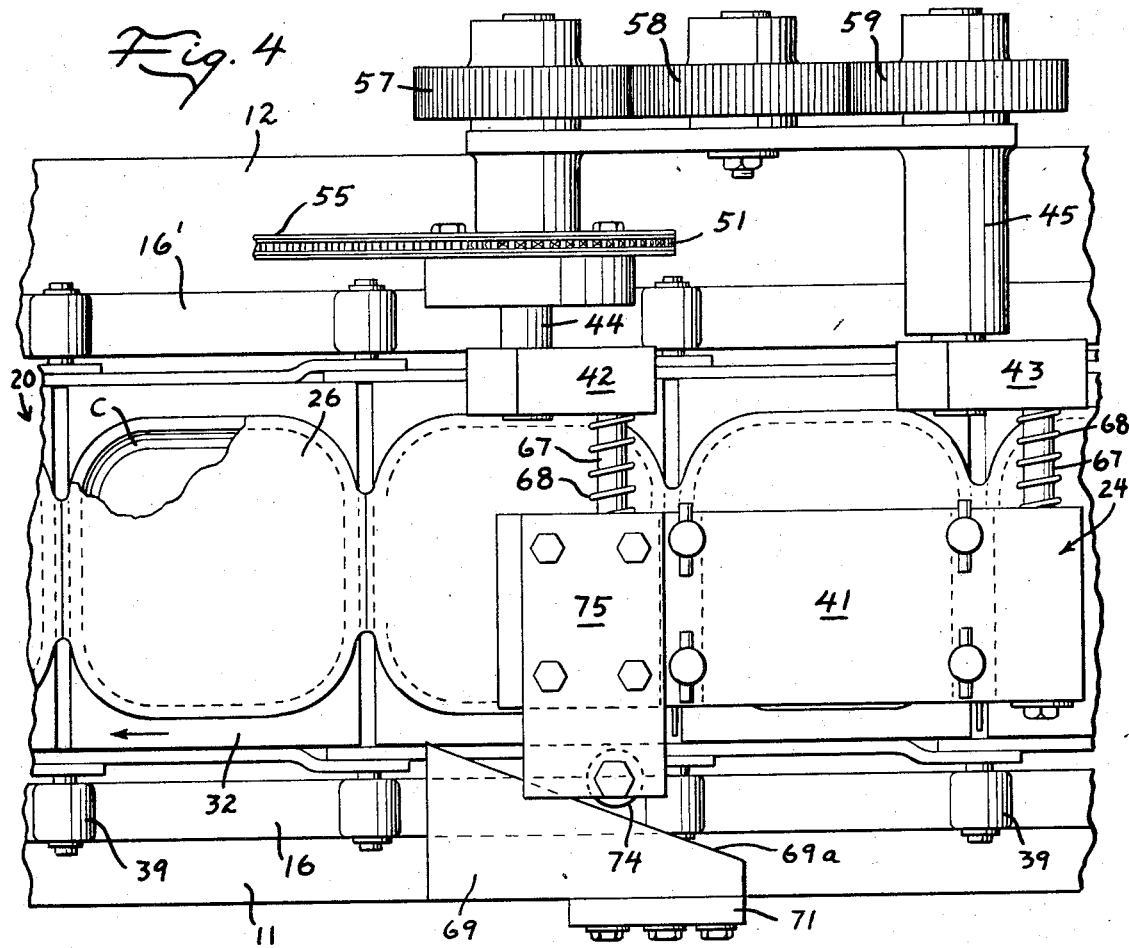
FIG. 4 is a fragmentary top elevation of the machine showing the cutting mechanism in a position intermediate the positions of FIGS. 2 and 3 and on a large scale.

In orbit, the cutting mechanism moves from an extreme upper position as shown in FIG. 3 downwardly to an intermediate position such as in FIGS. 4 and 5. The illustrated intermediate position is just prior to piercing of the cover material by the cutting blades and just prior to engagement of the cam face 69a by the cam follower 74. During the lower portion of the orbit, the blades move in the same direction as the conveyor, and have the crosswise motion imparted to them by the camming arrangement. The extreme, cammed position is shown in FIG. 2 at the lower portion of the orbit. After passing the cam face, the springs 68 urge the support 41 and blades 40, 40' back to the position illustrated in FIG. 3 preliminary to a succeeding orbit.

The cutter blades 40 or 40' are advantageously removably mounted as shown in FIGS. 5 and 6 so that they can be quickly and easily replaced should they become dull.

It is now deemed obvious that the present invention provides a packaging machine with a continuously moving conveyor and an orbital type cutting mechanism in which the cutting mechanism is arranged to move crosswise of the conveyor while orbiting to sever the cover material.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. In a packaging machine having a conveyor for advancing a plurality of containers in one direction, drive means for driving the conveyor to continuously advance the containers, and means for sealing a continuous sheet of cover material to the tops of the containers, the improvement comprising: a cutting mechanism for cutting the cover material between adjacent containers to thereby separate the same; the cutting mechanism including a cutter, support means mounting the cutter for orbital movement relative to the conveyor, means for driving the support means correlative to advancement of the conveyor so that the cutter moves in said one direction during the portion of its orbit closest to the conveyor, a cam having a surface extending oblique to said one direction, and the cutting mechanism having a cam follower for engaging the cam surface to move the cutter crosswise of the conveyor when it is in said portion of its orbit so that the cutter severs the cover material in a direction crosswise of the moving conveyor.

2. The combination of claim 1 wherein the cutter is a blade extending in a direction crosswise of the conveyor.

3. The combination of claim 1 wherein the conveyor includes a plurality of receivers shaped for receiving at least one container and spaced apart at their upper ends to accommodate the cutter therebetween.

4. The combination of claim 3 wherein the cutting mechanism includes two cutters spaced along the conveyor a distance equal to the pitch of the receivers.

5. The combination of claim 1 wherein the cutting mechanism has means for resiliently urging the cutters in a direction toward the cam.

6. In a packaging machine for operation with open top rimmed containers and a strip of cover material sealed to the container rims; the machine having a conveyor for supporting the containers in spaced relation and advancing them in one direction past a cutting station, and drive means for driving the conveyor to continuously advance the containers, the improvement comprising: a cutting mechanism disposed above the conveyor at the cutting station for cutting the cover material between adjacent containers and including a cutter, means for moving the cutter in an orbital path which includes a lower portion in which the cutter is moved in said one direction and an upper portion in which the cutter is moved in the opposite direction, the cutter having at least a portion disposed between the containers below the level of the cover material during the lower portion of the orbit, a cam at the cutting station having a surface extending oblique to said one direction, the cutting mechanism having follower means for engaging the cam surface to move the cutter crosswise of the conveyor when it is at the level below the cover material to sever the same between adjacent containers, and means for resiliently urging the follower means against the cam surface and for returning the cutter to its initial crosswise position after the follower means passes the cam surface.

7. A packaging machine as set forth in claim 6 wherein the conveyor includes a plurality of receivers shaped for receiving at least one container, and means for swingably connecting the receivers to form an endless conveyor and with their upper ends spaced apart to accommodate the cutter therebetween.

8. A packaging machine as set forth in claim 7 wherein the cutting mechanism includes two cutters spaced apart a distance equal to the pitch of the receivers.

9. A packaging machine as set forth in claim 8 wherein each cutter is a blade extending in a direction crosswise of the conveyor.

10. A packaging machine for operation with open top rimmed containers, and comprising: a conveyor having receivers for supporting the containers in spaced relation; drive means for continuously driving the conveyor to continuously advance the containers past a sealing station and a cutting station; means on the machine for positioning a strip of cover material adjacent the tops of the containers; sealing means on the machine at the sealing station for sealing the cover material to the tops of the containers as they are advanced; a cutter supported on the machine at the cutting station; means for moving the cutter correlative to the movement of the conveyor in an orbital path which includes a lower portion in which the cutter is moved in the same direction as the conveyor and in which the cutter is disposed between adjacent containers below the level of the cover material; a stationary cam on the machine at the cutting station having a face oblique to the path of the containers past the cutting station; and a cam follower carried with the cutter for engaging the cam face to move the cutter crosswise of the conveyor during the lower portion of the orbit to sever the cover material between the containers.

* * * * *